United States Patent [19]

Uchimi

[11] Patent Number: 4,656,527
[45] Date of Patent: Apr. 7, 1987

[54] MAGNETIC RECORDING AND PLAYBACK APPARATUS

[75] Inventor: Takashi Uchimi, Yokohama, Japan

[73] Assignee: Victor Company of Japan, Limited, Kanagawa, Japan

[21] Appl. No.: 672,565

[22] Filed: Nov. 19, 1984

[30] Foreign Application Priority Data

Nov. 25, 1983 [JP] Japan .................................. 58-221533

[51] Int. Cl.⁴ .......................... H04N 5/782; H04N 5/95
[52] U.S. Cl. ..................................... 358/320; 358/310; 358/316; 360/36.2
[58] Field of Search ............... 358/108, 319, 320, 324, 358/311, 313, 325, 326, 310, 335, 149, 328; 360/11.1, 14.1, 14.2, 14.3, 36.1, 36.2, 33.1, 22

[56] References Cited

U.S. PATENT DOCUMENTS

| 4,018,990 | 4/1977 | Long et al. ........................... 360/36.2 |
| 4,027,333 | 5/1977 | Kaiser et al. ........................ 360/11.1 |
| 4,099,205 | 7/1978 | Hattori et al. ....................... 358/149 |
| 4,193,084 | 3/1980 | Yamagiwa et al. ................. 358/328 |
| 4,198,656 | 4/1980 | Mathisen ............................. 358/108 |
| 4,392,162 | 7/1983 | Yamamoto ........................... 360/22 |
| 4,463,387 | 7/1984 | Hashimoto et al. ................ 358/310 |
| 4,549,227 | 10/1985 | Hashimoto et al. ................ 358/328 |

Primary Examiner—Donald McElheny, Jr.
Attorney, Agent, or Firm—Jordan and Hamburg

[57] ABSTRACT

A magnetic recording and playback apparatus capable of simultaneously recording a plurality of information signals on a single magnetic recording medium and, thereby allowing recording a plurality of broadcast programs unattended. A signal to be recorded and associated with one a plurality of input composite video signals and a signal subjected to signal processing such that a vertical sync signal of another composite video signal is synchronous with that of the one composite video signal are applied to respective rotary heads, the two signals being simultaneously recorded on the recording medium.

14 Claims, 13 Drawing Figures

MAGNETIC RECORDING AND PLAYBACK APPARATUS

BACKGROUND OF THE INVENTION

The present invention relates to a recording and playback apparatus and, more particularly, to a magnetic recording and playback apparatus which uses a magnetic tape or like magnetic recording medium.

Traditionally, television (TV) broadcasts were rather passive enjoyment because one could not view a desired program unless his or her daily schedule is matched to the programming preschedule at a broadcasting station. That is, one often misses his or her desired TV programs due to absence on business or other daily activities during the hours for which the TV programs are on the air.

One of the recent achievements in the realm of electronics is a magnetic recording and playback apparatus (VTR) for public use which allows television signals or like information signals (video and audio signals) to be recorded in and later reproduced from magnetic or other recording media for a time shifting purpose. VTRs are now widely spreading by virtue of the increasing trend toward lower prices as well as of utility. When aided by a timer, for example, a VTR is capable of automatically recording a desired TV program transmitted from a broadcasting station even if unattended by a person. Such a capability of a VTR turns the traditional passive enjoyment to an active one allowing a person to see a desired program at any desired time. Specifically, if one sets a timer to condition the VTR for unattended recording of a desired future program before leaving on business, for example, he or she may reproduce the recorded program later and view it during any spare time.

The use of a VTR, therefore, offers one the freedom of choosing a time to see a desired TV program which is scheduled by a broadcasting station, not to speak of the freedom of choosing the program.

Meanwhile, ever developing electronic circuit and precision machining technologies are promoting the production of smaller and lighter and, yet, higher performance VTRs in addition to the previously discussed trend toward lower cost. Reduction in size and weight of a VTR enables it to be held by hand with ease and the operability under the hand-held position is under improvement. The high performance of a VTR, on the other hand, makes it possible to readily record high quality pictures and, thereby encourages one to create his original pictures by using a video camera connected to his VTR.

Now, while a single VTR cannot record but a single TV program, it is sometimes desired to record, while absent, a plurality of TV programs in the same time zone. Such a desire has heretofore been fulfilled naturally by preparing a plurality of VTRs commensurate with the number of desired programs. However, preparing a plurality of VTRs is rather awkward because VTRs are still expensive despite the trend toward lower prices. Also, since the frequency of a plurality of desired TV programs existing in a common time zone is not very high, preparation of a plurality of VTRs is inefficient as regards utility.

Further, there is an occasion in program creation in which a single scene may be picked up by two video cameras connected individually to VTRs, i.e., one fixed in place for shooting the whole scene over a wide angle and the other hand-held for shooting telescopic details of the scene. In such a case, at least two VTRs are required. Again, preparing a plurality of VTRs is awkward and inefficient because they are not very inexpensive and because the chance of shooting the same scene by use of a plurality of video cameras is rare.

SUMMARY OF THE INVENTION

It is therefore an object of the present invention to provide a recording and playback apparatus which allows a plurality of discrete information signals to be recorded simultaneously on a single recording medium and reproduced thereoutof.

It is another object of the present invention to provide a VTR capable of recording a plurality of broadcast programs unattended.

It is another object of the present invention to provide a VTR to which a plurality of video cameras can be connected for simultaneous recording.

It is another object of the present invention to provide a VTR capable of recording and reproducing high fidelity audio signals together with video signals.

It is another object of the present invention to provide a generally improved recording and playback apparatus.

In one aspect of the present invention, there is provided a single recording and playback apparatus for recording and reproducing at least two discrete input composite video signals in and out of a single recording medium, comprising a first record signal generator circuit for generating a first record signal to be recorded from one of the at least two composite video signals, a second record signal generator circuit for generating a second record signal to be recorded by synchronizing a vertical sync signal of the one composite video signal to a vertical sync signal of the other composite video signal, and rotary heads for simultaneously recording the first and second record signals in the recording medium and subsequently reproducing the recorded signals selectively out of the recording medium.

in accordance with another aspect of the present invention, there is provided a single magnetic recording and playback apparatus for recording and reproducing at least two discrete input composite video signals in and out of a single magnetic recording medium, comprising a first record signal generator circuit for generating a first record signal to be recorded from one of the at least two composite video signals, a second record signal generator circuit for generating a second record signal to be recorded by synchronizing a vertical sync signal of the one composite video signal to a vertical sync signal of the other composite video signal, and rotary heads for simultaneously recording and reproducing the first and second record signals in the magnetic recording medium and subsequently reproducing the recorded signals selectively out of the magnetic recording medium.

In accordance with another aspect of the present invention, there is provided a single recording and playback apparatus for recording and reproducing a plurality of discrete input composite video signals in and out of a single recording medium, comprising a first record signal generator circuit for generating a first record signal to be recorded from one of the plurality of composite video signals, a second record signal generator circuit for generating a second record signal to be recorded by synchronizing a vertical sync signal of the one composite video signal to a vertical sync signal of another of the composite video signals, and rotary heads supplied with the first and second record signals for simultaneously recording the plurality of composite video signals in the recording medium and subsequently reproducing the recorded signals selectively out of the recording medium.

The above and other objects, features and advantages of the present invention will become apparent from the following detailed description taken with the accompanying drawings.

BRIEF DESCRIPTION OF THE DRAWINGS

FIG. 1, comprised of FIGS. 1A & 1B, is a block diagram of a recording system forming part of a recording and playback apparatus embodying the present invention;

DESCRIPTION OF THE PREFERRED EMBODIMENT

While the magnetic recording and playback apparatus of the present invention is susceptible of numerous physical embodiments, depending upon the environment and requirements of use, a substantial number of the herein shown and described embodiments have been made, tested and used, and all have performed in an eminently satisfactory manner.

Reference will be made to FIGS. 1-12 for describing a preferred embodiment of the recording and playback apparatus in accordance with the present invention.

First, signal paths along which information signals applied to a recording system of the apparatus pass through to become record signals to be recorded while being subjected to various kinds of signals processing will be explained with reference to FIG. 1.

Figures 1, 1A:
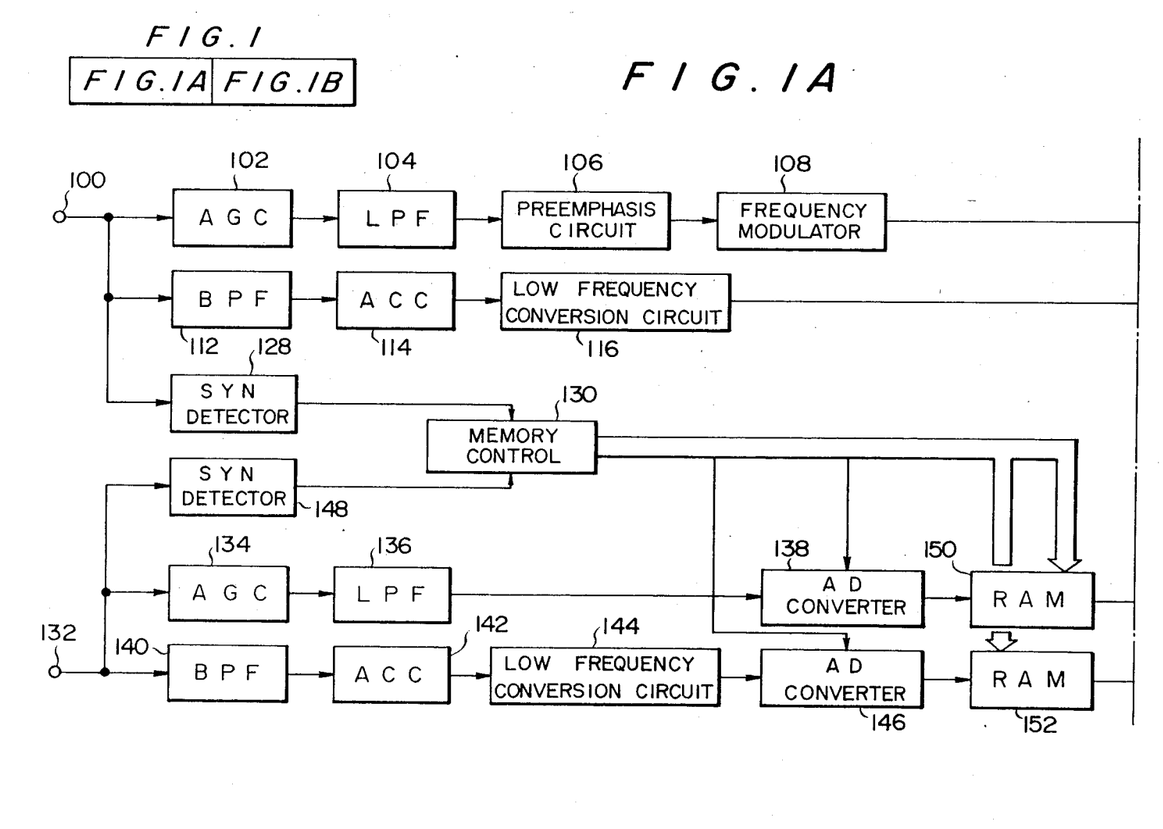
Figure 1B:
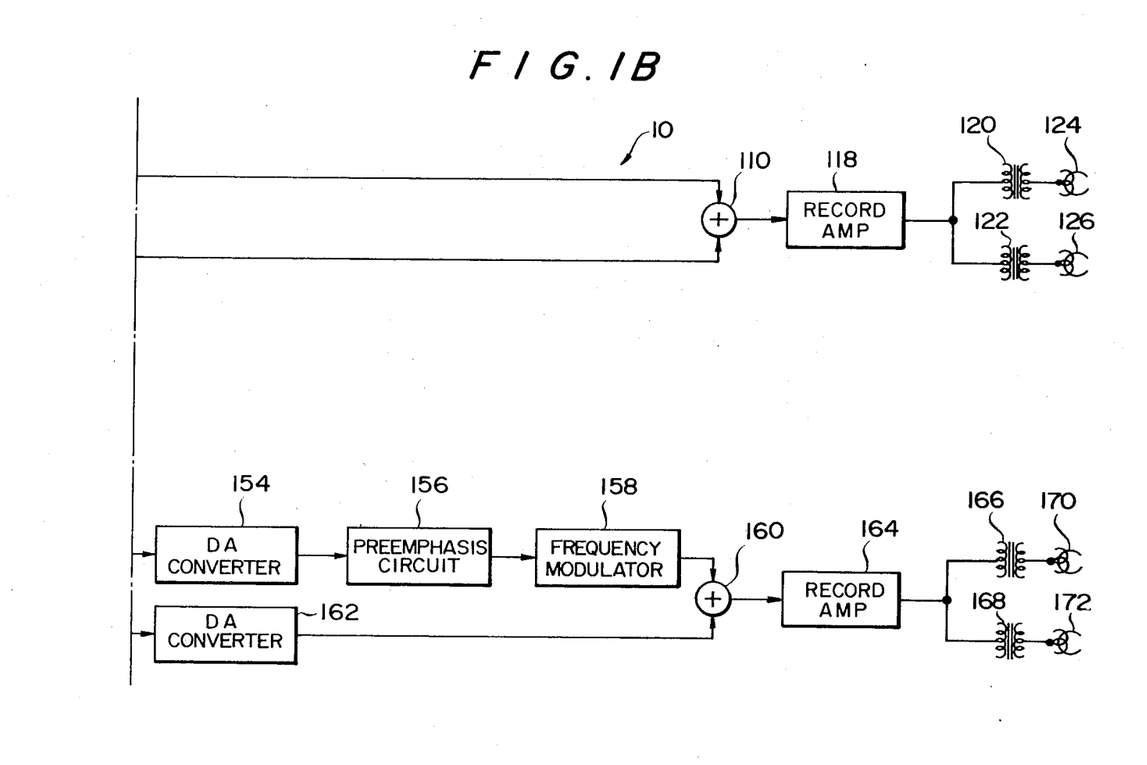

Referring to FIG. 1, the recording system, generally 10, comprises a first input terminal 100, an automatic gain control (AGC) circuit 102, a low-pass filter (LPF) 104, a preemphasis circuit 106, a frequency modulator 108, a mixer 110, a band-pass filter (BPF) 112, an automatic chroma control (ACC) circuit 114, a low frequency range conversion circuit 116, a record amplifier 118, rotary transformers 120 and 122, record heads 124 and 126, a sync detector 128, and a memory control circuit 130. The recording system 10 further comprises a second input terminal 132, an AGC 134, an LPF 136, an analog-to-digital (AD) converter 138, a BPF 140, an ACC 142, a low frequency range conversion circuit 144, an AD converter 146, a sync detector 148, random access memories (RAM) 150 and 152, a digital-to-analog (DA) converter 154, a preemphasis circuit 156, a frequency modulator 158, a mixer 160, a DA converter 162, a record amplifier 164, rotary transformers 166 and 168, and record heads 170 and 172.

Routing and signal processing associated with a first video signal (composite video signal) which is a first information signal will be described first. The first video signal is applied to the first input terminal 100 from which three signal paths diverge. In a first signal path, the first video signal is controlled by the AGC 102 to a predetermined signal level and, then, applied to the LPF 104. The LPF 104 separates a luminance signal component from the first video signal and delivers it to the preemphasis circuit 106. The circuit 106 boosts a high frequency component contained in the luminance signal component. The output of the circuit 106 is modulated by the frequency modulator 108 and, then, routed to the mixer 110.

In a second signal path, the first video signal is applied to the BPF 112 to have its color signal component separated. The separated color signal component is controlled by the ACC 114 so that a color burst signal thereof gains a predetermined level. The output of the ACC 114 is applied to the low frequency range converter 116. The output of the converter 116 is a low frequency range converted color signal (referred to simply as a converted color signal hereinafter) having a frequency lower than that of the frequency modulated (FM) luminance signal and a phase which is inverted by each 90 degrees at every 1 H (horizontal sync period) (so-called phase-shift (PS) signal processing). The converted color signal is applied to the mixer 110. The mixer 110 mixes the FM luminance signal and converted color signal of the first video signal to produce a record signal to be recorded, which is then delivered to the record amplifier 118. The record amplifier 118 processes the record signal to provide it with an optimum recording current value. The output of the record amplifier 118 is routed through the rotary transformers 120 and 122 to the record heads 124 and 126.

In a third signal path, the first video signal is applied to the sync detector 128 whereby a sync signal is separated from the first video signal. The sync signal is applied to the memory control 130.

Next, routing and signal processing associated with a second video signal (composite video signal) will be described. The second video signal is applied to the second input terminal 132 from which three signal paths diverge. In a first signal path, the second video signal is controlled by the AGC 134 to a predetermined signal level and, then, applied to the LPF 136. The LPF 136 separates a luminance signal component from the second video signal, the output of LPF 136 being fed to the AD converter 138.

In a second signal path, the second video signal is coupled to the BPF 140 to have its color signal component separated. The separated color signal component is routed to the ACC 142 which then controls the input such that the level of a color burst signal becomes constant. The output of the ACC 142 is applied to the low frequency range conversion circuit 144 to be thereby converted to a signal whose frequency lies in a range lower than that of the FM luminance signal of the second video signal, while being subjected to PS signal processing which is opposite in direction to the PS signal processing applied to the color signal of the first video signal. The output of the circuit 144, a converted color signal, is routed to the AD converter 146.

In a third signal path, the second video signal is applied to the sync detector 148 which is adapted to separate a sync signal from the second video signal. The sync signal is delivered to the memory control 130.

Now, where a composite video signal is to be recorded in a magnetic tape or like recording medium, a servo circuit for controlling the rotation speed of a head is operated matched to a composite video signal applied thereto and in synchronism with a sync signal contained in the video signal. It follows that where two discrete composite video signals are to be recorded in a single recording medium, or by a single recording and playback apparatus, the servo circuit is operated matched to a main signal (assuming that the first signal is a main signal, the second video signal is a subsignal) and in synchronism with a sync signal contained in the main signal.

Although a nominal vertical sync frequency of a composite video signal is 59.94 Hz and the two discrete composite video signals are in approximate synchronization of their vertical sync signals, the two vertical sync signals are often slightly different in phase and sometimes in frequency. If this is the case, recording or playback of them is difficult as such discrepancy accumulates or fluctuate as the recording or playback progresses. To simultaneously record or reproduce such two composite video signals, it is a primary requisite that the phases and frequencies of their vertical sync signals be matched to each other. Such a requisite can be fulfilled if the frequency and phase of the vertical sync signal of the subsignal are matched to those of the vertical sync signal of the main signal with which the recording and playback apparatus is synchronized. The matching may be implemented by a delay circuit of the type using a digital memory as will be described hereinafter.

The luminance signal component applied from the LPF 136 to the AD converter 138 is sampled and held by the AD converter 138 in response to sampling clock whose frequency is 2 fsc (fsc representing color a color carrier frequency), the output of the AD converter 138 being a 7-8 bits digital signal. The digital signal is routed to the RAM 150 and, then, written in the RAM 150 in response to write pulses generated by the memory control 130. The converted color signal fed from the low frequency range conversion circuit 144 to the AD converter 146 is converted to a digital signal by, for example, delta modulation in response to sampling clock the frequency of which is similar to that of the above-mentioned sampling clock. The digital signal is applied to the RAM 152 and, like the luminance signal component, written in the RAM 152 in response to write pulses generated by the memory control 130.

The memory control 130, comparing the sync signals output from the sync detectors 128 and 148, supplies the RAMs 150 and 152 with read pulses which cause signals read out the RAMs 150 and 152 to share substantially the same phase with the vertical sync signal of the first video signal. In repsonse to these write pulses, the digital signal already stored in RAM 150 is read out and as is also the digital signal already stored in the RAM 152. Therefore, the digital signals output from the RAMs 150 and 152 (analog-to-digital converted versions of the luminance signal component and converted color signal component of the second video signal produced respectively by the AD converters 138 and 146) are substantially the same in phase as the vertical sync signal of the first video signal.

Figure 12:
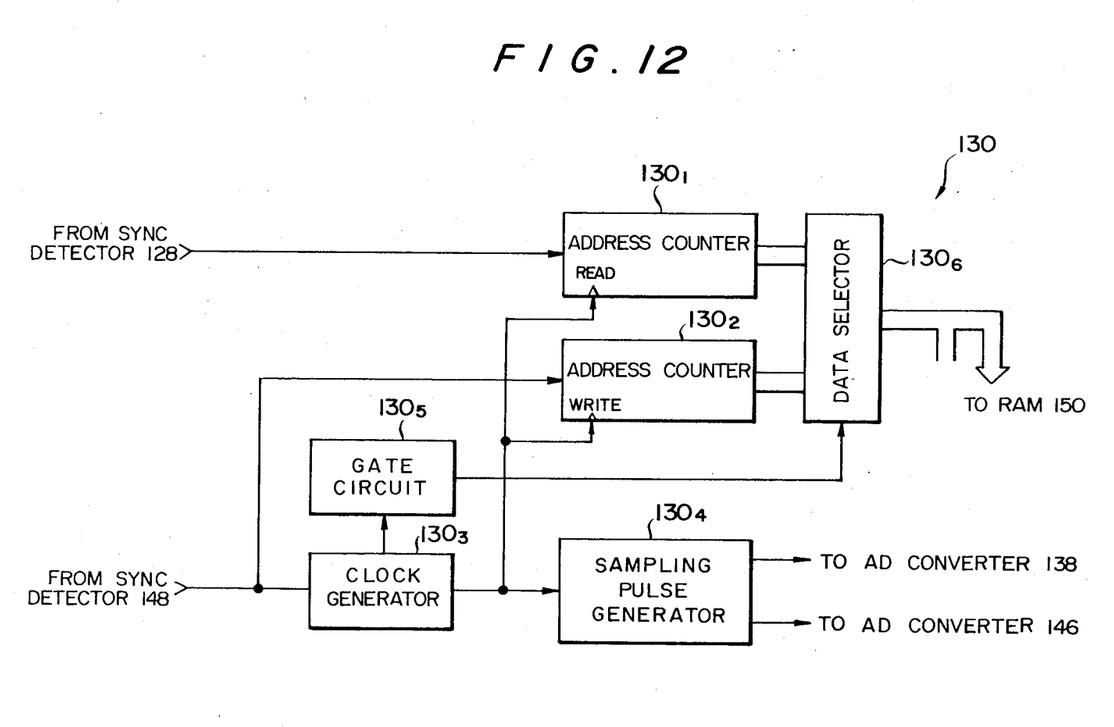
FIG. 12 is a block diagram of the memory control shown in FIG. 1.

The circuit arrangement of the memory control 130 is shown in FIG. 12. The sync signal from the sync detectors 128 and 148 are fed to an address counters 130$_1$ and 130$_2$, respectively. The sync signal from the sync detector 148 is also fed to a clock generator 130$_3$ which produces clock pulses which are fed to a sampling pulse generator 130$_4$ and to a read input of the address counter 130$_1$ and a write input of the address counter 130$_2$. The pulses are also fed through a gate circuit 130$_5$ to a data selector 130$_6$. The data selector 130 which is supplied with output signals from the address counters 130$_1$ and 130$_2$ supplies the RAMs 150 and 152 with the read pulses.

The digital signal read out of the RAM 150 is converted by the DA converter 154 to an analog signal and supplied as a luminance signal component of the second video signal to the preemphasis circuit 156. The circuit 156 boosts a high frequency component of the luminance signal of the second video signal. The luminance signal component output from the circuit 156 is applied to the frequency modulator 158 and the resulting FM luminance signal component is applied to the mixer 160. Meanwhile, the digital signal read out of the RAM 152 is converted by the DA converter 162 to an analog signal and supplied as a converted color signal of the second video signal to the mixer 160. The mixer 160 mixes the FM luminance signal component and converted color signal component of the second video signal to produce a record signal to be recorded. The record signal is provided with an optimum recording current value by the record amplifier 164 and, then, routed through the rotary transformers 166 and 168 to the associated record heads 170 and 172.

Hereinafter will be described, with reference to FIGS. 2-8, a recording pattern which is developed on a recording medium by the record signals output from the record system shown in FIG. 1.

Figure 2:
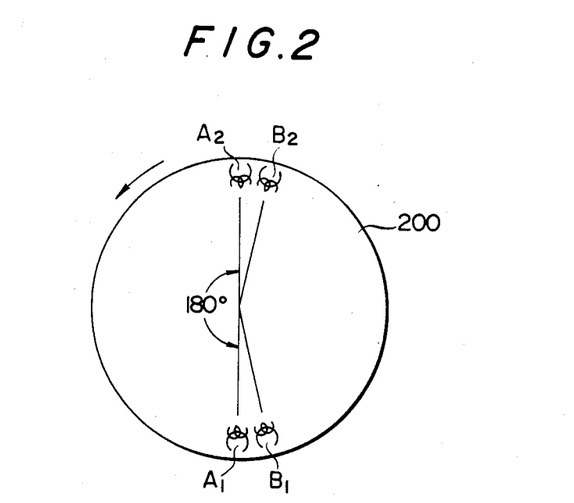
FIG. 2 shows rotary heads positioned in a first exemplary relationship in accordance with the present invention.

In FIG. 2, there is shown a first example of a head arrangement in accordance with the illustrative embodiment of the present invention. As shown in FIG. 2, a rotary body 200 such as a rotary drum or a disc plate supports thereon a pair of rotary heads A$_1$ and A$_2$ which are disposed at an angular spacing of 180 degrees. The rotary body 100 also supports a rotary head B$_1$ in a position ahead of the head A$_1$ by a small angle with respect to a rotating direction of the body 200 (counter-clockwise as indicated by an arrow in FIG. 2), i.e., a position adjacent to the head A$_1$ forming an head group, and a rotary head B$_2$ in a position behind of the head A$_2$ by a small angle with respect to the rotating direction of the body 200, i.e., a position adjacent to the head A$_2$ forming another head group.

The heads A$_1$ and A$_2$ correspond respectively to the record heads 124 and 126 shown in FIG. 1, and the heads B$_1$ and B$_2$ to the record heads 170 and 172. That is, the record signal associated with the first video signal applied to the first input terminal 100 is coupled to the heads A$_1$ and A$_2$, and the record signal associated with the second viedo signal applied to the second input terminal 132 to the heads $B_1$ and $B_2$.

Figure 3:
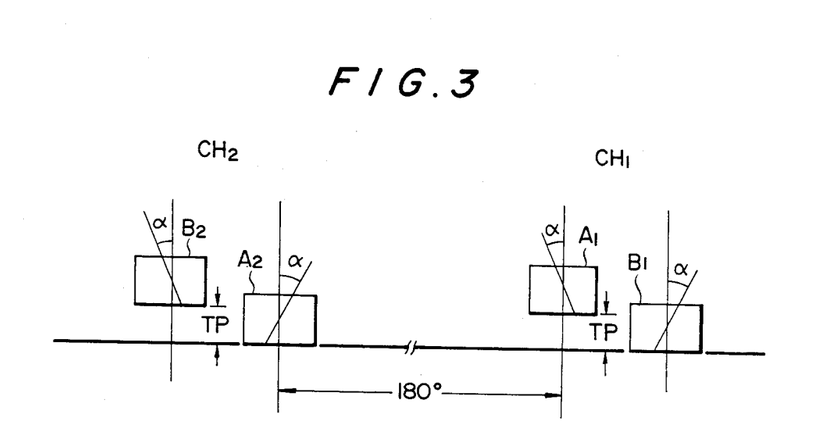
FIG. 3 is a schematic developed view of the head arrangement shown in FIG. 2.

The head arrangement of FIG. 2 is shown in a developed view in FIG. 3. As shown, the heads $A_1$ and $A_2$ have azimuth angles $\alpha$ which are the same in absolute value but opposite in sign. These azimuth angles are so selected to be compatible with currently marketed recording and playback apparatuses (e.g. +6 degrees and −6 degrees). On the other hand, the azimuth angle of the head $B_1$ is the same in absolute value as that of the head $A_1$ but opposite in direction, that is, equal to the azimuth angle of the head $A_2$. The azimuth angle of the head $B_2$ is the same in absolute value as that of the head $A_2$ but opposite in direction, that is, equal to the azimuth angle of the head $A_1$.

As also shown in FIG. 3, the heads $A_2$ and $B_1$ share the same level, or height, while the heads $A_1$ and $B_2$ are higher than the heads $A_2$ and $B_1$ by a track pitch TP of tracks produced on a recording medium. In FIG. 3, TP designates the track pitch.

Figure 4:
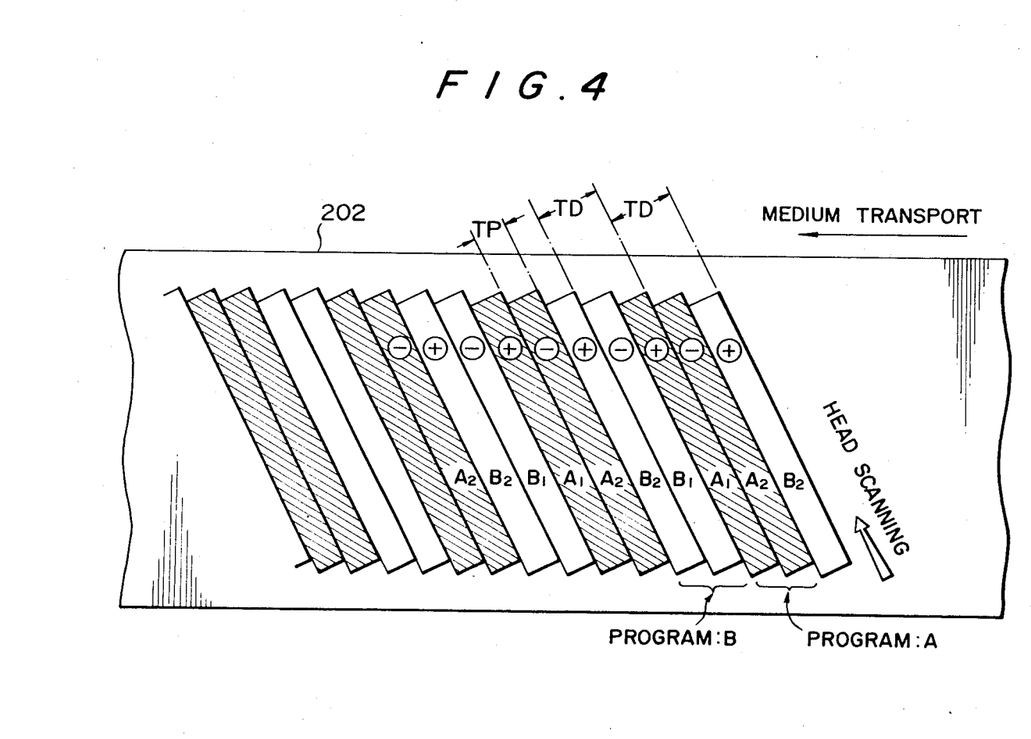
FIG. 4 shows a recording pattern provided by the rotary heads in the arrangement of FIG. 2 on a recording medium.

Referring to FIG. 4, a recording pattern developed by the head arrangement of FIG. 2 on a recording medium 202 is shown. In FIG. 4, TP designates the track pitch, and TD a recording width which is covered by one scan of either head group and corresponds to a track pitch designed for VTRs now in the market. In accodance with the illustrative embodiment, one field of information of the first and second video signals are recorded over the recording width TD. Assume that tracks on the recording medium which are provided by the heads $A_1$ and $A_2$ and associated with the first video signal constitute a program A as shaded tracks shown in FIG. 4 and those provided by the heads $B_1$ and $B_2$ and associated with the second video signal, a program B. The tracks formed by the head $A_1$ are labeled $A_1$ in FIG. 4, those formed by the head $A_2$ labeled $A_2$, those formed by the head $B_1$ labeled $B_1$, and those formed by the head $B_2$ labeled $B_2$. A transport direction of the recording medium 202 and a scanning direction of the heads are each indicated by arrows in FIG. 4.

In the above condition, the heads at $CH_1$ in FIG. 3 (heads $A_1$ and $B_1$) develop tracks $B_1$ and $A_1$ in this order on the recording medium 202, while the heads at $CH_2$ in FIG. 3 (heads $A_2$ and $B_2$) develop tracks $A_2$ and $B_2$ in this order on the medium 202. Due to the particular relationship in azimuth angle between the heads $A_1$, $A_2$, $B_1$, and $B_2$ shown in FIG. 3, the difference in azimuth angle between nearby heads during formation of the recording pattern of FIG. 4 is double the absolute value of each head (e.g. 12 degrees), so that interference between nearby tracks is prevented during recording or playback.

Further, the low frequency range conversion circuits 116 and 144 shown in FIG. 1 are constructed such that the phase shift associated with the program A and that associated with the program B are made opposite to each other (e.g. +90 degrees phase shift and −90 degrees phase shift), thereby eliminating crosstalk between the converted color signal components during the recording mode operation. In this construction, if the phase shift is switched by drum F/F pulses (drum switching pulses) in such a manner as to invert the phase shift direction associated with the track $A_2$ relative to that associated with the track $A_1$ and invert the phase shift direction associated with the track $B_2$ relative to that associated with the track $B_1$, the phase shifts in the nearby tracks in the recording pattern shown in FIG. 4 will be opposite to each other. That is, since the tracks $A_1$ and $B_2$ share the same phase shift (e.g. +90 degrees phase shift and labeled "+" in FIG. 4) and so do the tracks $A_2$ and $B_1$ (e.g. −90 degrees phase shift and labeled "−" in FIG. 4), crosstalk between the converted color signal components can be eliminated as in the currently available VTRs.

Figure 5:
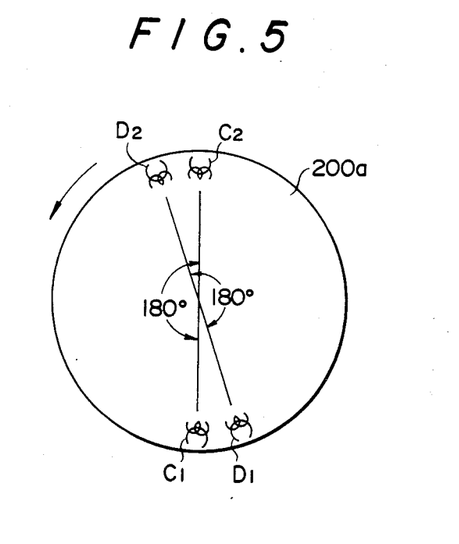
FIG. 5 shows rotary heads positioned in a second exemplary relationship in accordance with the present invention.
Figure 6:
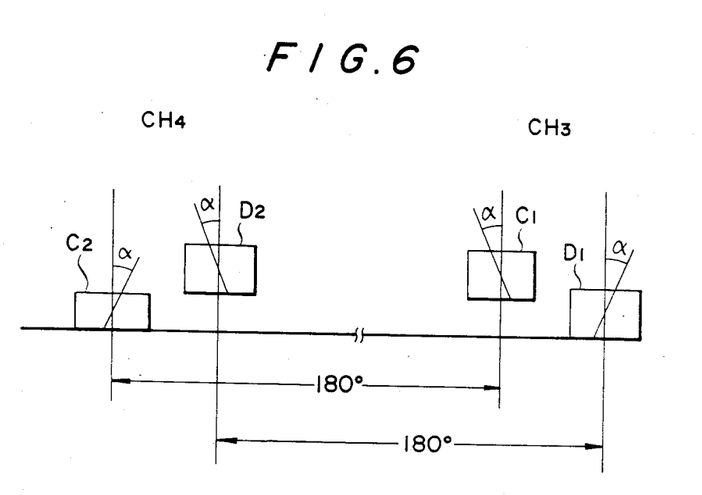
FIG. 6 is a schematic developed view of the head arrangement shown in FIG. 5.

In the head arrangement shown in FIGS. 2 and 3, the head $B_1$ is positioned ahead of the head $A_1$ and the head $B_2$ behind of the head $A_2$, the angular spacing between the heads $B_1$ and $B_2$ being not 180 degrees. The 180 angular spacing is attainable if the heads are arranged in an alternative relationship shown in FIG. 6. That is, FIG. 5 shows a second example of the head arrangement in accordance with the present invention. FIG. 6 is a developed view of the head arranement of FIG. 5.

Referring to FIG. 5, a rotary body 200a is shown and rotating in a direction indicated by an arrow. In FIGS. 5 and 6, the heads corresponding to the heads $A_1$, $A_2$, $B_1$ and $B_2$ of FIGS. 2 and 3 are labeled $C_1$, $C_2$, $D_1$ and $D_2$, respectively; $CH_1$ and $CH_2$ of FIG. 3 correspond to $CH_3$ and $CH_4$, respectively. The azimuth angles of the heads $C_1$, $C_2$, $D_1$ and $D_2$ are each selected in correspondence with the heads $A_1$, $A_2$, $B_1$ and $B_2$. Further, the signals applied to the heads $C_1$, $C_2$, $D_1$ and $D_2$ correspond respectively to those applied to the heads $A_1$, $A_2$, $B_1$ and $B_2$.

The heads $C_1$ and $D_1$ at $CH_3$ in FIG. 6 are arranged in the same manner as the heads $A_1$ and $B_1$ of FIGS. 2 and 3 and, therefore, produce a similar recording pattern. That is, they form the tracks $B_1$ and $A_1$ in this order on the recording medium 202a.

The heads $C_2$ and $D_2$ at $CH_4$, on the other hand, are different in arrangement from the heads $A_2$ and $B_2$ of FIG. 3 (opposite arrangement) and, therefore, they develop the tracks $B_2$ and $A_2$ of FIG. 4 in this order. Hence, should the head $C_2$ have a substantial width, the track $B_2$ formed by the head $D_2$ which is ahead of the head $C_2$ would partly be erased while the head $C_2$ is forming the track $A_2$. It follows that to achieve a desirable recording pattern at least the head $C_2$ has to be provided with a width which is equal to the track pitch TP.

The phase shifts applied to the converted color signal components of the record signals which are applied to the heads of FIGS. 5 and 6 are the same as those of the converted color signal components of the record signals which are applied to the heads of FIGS. 2 and 3. Therefore, the heads $C_1$, $C_2$, $D_1$ and $D_2$ in the arrangement of FIGS. 5 an 6 will develop a recording pattern which is identical with the recording pattern of FIG. 4.

Figure 7:
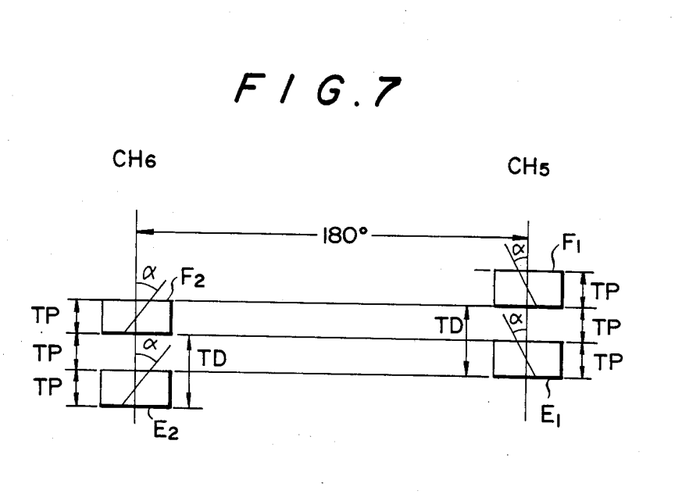
FIG. 7 is a schematic developed view of a third example of the head arrangement in accordance with the present invention.
Figure 8:
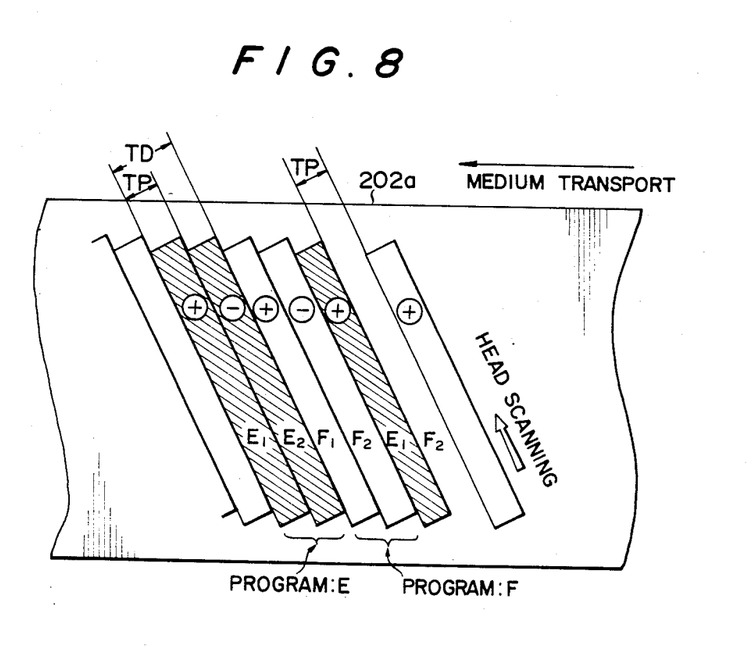
FIG. 8 shows a recording pattern attainable with the rotary heads in the arrangement of FIG. 7 of a recording medium.

A third example of the head arrangement in accodance with the present invention is shown in FIG. 7 which, like the second example, sets up an angular spacing of 180 degrees between each associated heads. FIG. 8 shows a recording pattern developed on a recording medium by the head arrangement of FIG. 7. In FIG. 7, $CH_5$ and $CH_6$ correspond respectively to $CH_1$ and $CH_2$ of FIG. 3, and heads $E_1$, $E_2$, $F_1$ and $F_2$ to the heads $A_1$, $A_2$, $A_3$ and $A_4$.

As shown in FIG. 7, the heads at $CH_5$ (heads $E_1$ and $F_1$) are each spaced 180 degrees from the heads at $CH_6$ (heads $E_2$ and $F_2$). The head $F_1$ at $CH_5$ is positioned higher than the head $E_1$ by a vertical distance equal to the track pitch TP. The centers of the heads $E_1$ and $F_1$ are aligned with each other. The head $F_2$ at $CH_6$ is higher than the head $E_2$ by a vertical distance equal to the track pitch TP. The centers of the heads $E_2$ and $F_2$ are aligned with each other. The top of the head $E_2$ and the bottom of the head $E_1$ are at the same height and so are the top of the head $E_1$ and the bottom of the head $F_2$. Further, the top of the head $F_2$ and the bottom of the head $F_1$ are at the same height.

Referring to FIG. 8, 202a designates a recording medium, TP the track pitch, and TD the recording width covered by one scan of the heads and corresponding to a track pitch designed for current VTRs. In the illustrative embodiment, one field of information of the first and second video signals is recorded over the recording width TD. Assume that tracks on the recording medium 202a developed by the heads $E_1$ and $E_2$ and associated with the first video signal constitute a program E as shaded tracks shown in FIG. 8 and those developed by the heads $F_1$ and $F_2$ and associated with the second video signal, a program F. In FIG. 8, the tracks formed by the head $E_1$ are labeled $E_1$ in the recording pattern, the tracks formed by the head $E_2$ $E_2$, the tracks formed by the heads $F_1$ $F_1$, and the tracks formed by the heads $F_2$ $F_2$. A transport direction of the recording medium 202a and a rotating direction of the heads are each indicated by arrows in FIG. 8.

When the head arrangement of FIG. 7 is employed for recording the signals, as shown in FIG. 8, the heads $E_1$ and $F_1$ at $CH_5$ produce the tracks $E_1$ and $F_1$ with an space track defined therebetween over a width equal to the track pitch TP. Then, the heads $E_2$ and $F_2$ produce the tracks $E_2$ and $F_2$. The track $E_2$ is formed in the above-mentioned empty space which extends over the track pitch TP and stores on information therein. The track $F_2$ is formed next to the track $E_1$.

The heads $E_1$ and $E_2$ are different in azimuth angle from each other (e.g. $+6$ degrees and $-6$ degrees) and so are the heads $F_1$ and $F_2$ (e.g. $+6$ degrees and $-6$ degrees). The heads $E_1$ and $F_1$ at $CH_5$ share the same azimuth angle. In the recording pattern of FIG. 8 provided by such a head arrangement, the nearby tracks are developed by those heads which have different azimuth angles so that interference therebetween is prevented as in the recording pattern provided by the head arrangement of FIGS. 2 and 3. Further, where the head arrangement of FIG. 7 is used to provide tracks in the pattern shown in FIG. 8, the tracks are arranged in the order of $E_1$, $E_2$, $F_1$, $F_2$, $E_1$... Hence, the phase shift in the record signal applied to the head $F_1$ needs only be the same as the phase shift in the converted color signal of the record signal applied to the heads $E_1$ (e.g. $+90$ degrees phase shift and labeled "+" in FIG. 8) and, likewise, the phase shift in the record signal applied to the head $F_2$ needs only be the same as the phase shift in the converted color signal of the record signal applied to the head $E_2$ (e.g. $-90$ degrees phase shift and labeled "$-$" in FIG. 8).

In the meantime, audio signals are recorded in audio tracks as is the case with current VTRs. Specifically, using audio tracks of a current VTR (stereophonic audio tracks), the program A (or E) may be recorded in the R-channel track of the stereophonic audio tracks and the program B (or F) in the L-channel track.

In the illustrative embodiment, the recording system is constructed to simultaneously record in a single recording medium two different programs, i.e., two different video signals which are the first video signal (program A in FIG. 4 or program E in FIG. 8) and the second video signal (program B in FIG. 4 or program F in FIG. 8). It should be noted, however, that the present invention is similarly applicable to a case wherein more than two programs, or video signals, are to be recorded simultaneously in a single recording medium.

Further, the recording system shown and described has recorded low frequency converted color signals to which a phase-shift (PS) signal processing is applied. If desired, the PS signal processing system may be replaced with a so-called phase inversion (PI) signal processing system. In accordance with the PI signal processing system, a low frequency converted color signal the phase of which is inverted by each 180 degrees at every 1 H (horizontal scan period) will be recorded in a certain track, and a low frequency converted color signal aligned in phase in the next track.

Reference will be made to FIGS. 8–11 for describing a playback system in accordance with the illustative embodiment of the present invention. As shown in a block diagram in FIG. 9, the playback system, generally 20 comprises a playback head 300, a rotary transformer 302, a preamplifier 304, a switch 306, a playback head 308, a rotary transformer 310, a preamplifier 312, a high-pass filter (HPF) 314, a frequency demodulator 316, an LPF 318, a deemphasis circuit 320, a mixer 322, an LPF 234, a high frequency conversion circuit 326, a BPF 328, a comb filter 330, a first output terminal 332, a playback head 334, a rotary transformer 336, a preamplifier 338, a switch 340, a playback head 342, a rotary transformer 344, a preamplifier 346, and a second output terminal 348.

A playback arrangement associated with the signal in the program A or E, which is the first video signal applied to the first input terminal 100 of FIG. 1, will be explained first.

The signal reproduced by the playback head 300 (first video signal stored in the tracks $A_1$ of FIG. 4 or the tracks $E_1$ of FIG. 8) is amplified by the preamplifier 304 to a predetermined signal level and, then, fed to the switch 306. Meanwhile, the signal reproduced by the playback head 308 (first signal stored in the tracks $A_2$ of FIG. 4 or the tracks $E_2$ of FIG. 8) is passed through the rotary transformer 310 to the preamplifier 312 to be thereby amplified to a predetermined signal level. The output of the preamplifier 312 is applied to the switch 306 which serves to connect one of the playback heads 300 and 308 which is reproducing an information signal out of the recording medium to the succeeding signal processing circuit.

One of the reproduced signals output from the switch 306 is routed to the HPF 314 to separate a frequency modulated component of the reproduced luminance signal. The separated frequency modulated component is demodulated by the frequency demodulator 316 the output of which is applied to the deemphasis circuit 320. The circuit 320 functions to attenuate the high frequency component which has been boosted by the preemphasis circuit 106 of FIG. 1, the output of the circuit 320 being delivered to the mixer 322.

The output of the switch 306 is also applied to the LPF 324 to separate the low frequency converted color signal component therefrom. The color signal component has been converted by previously the low frequency conversion circuit 116 of FIG. 1 to lie in a low frequency band. Supplied with the color signal component, the high frequency conversion circuit 326 reconverts the lowered frequency of the input signal back to that of the original color signal component while applying phase shift thereto which is opposite to the previously described phase shift. The output of the circuit 326 is passed through the BPF 328 and comb filter 330 to remove a crosstalk component and, then, fed to the mixer 322. The mixer 322 performs predetermined signal processing on the reproduced luminance signal and the reproduced color signal, then mixes them, and then delivers the composite signal to the first output terminal 332.

Next, a playback arrangement associated with the second video signal, or program B, applied to the second input terminal 132 of FIG. 1 will be described.

The signal reproduced by the playback head 334 (second video signal stored in the tracks $B_1$ of FIG. 4 or the tracks $F_1$ of FIG. 8) is applied to the switch 340 after being amplified by the preamplifier 338 to a predetermined signal level. The signal reproduced by the playback head 342 (second video signal stored in the tracks $B_2$ of FIG. 4 or the tracks $F_2$ of FIG. 8) are passed though the rotary transformer 344 to the preamplifier 346 to be thereby amplified to a predetermined signal level, the amplified signal being delivered to the switch 340.

The switch 340 connects one of the playback heads 334 and 342 which is reading an information signal output of the recording medium to the succeeding signal processing circuit. The reproduced signal from the switch 340 is fed out from the second output terminal 348 as a reproduced video signal (second video signal) after being processed in the same manner as the reproduced signal associated with the program A (or E).

Figure 9:
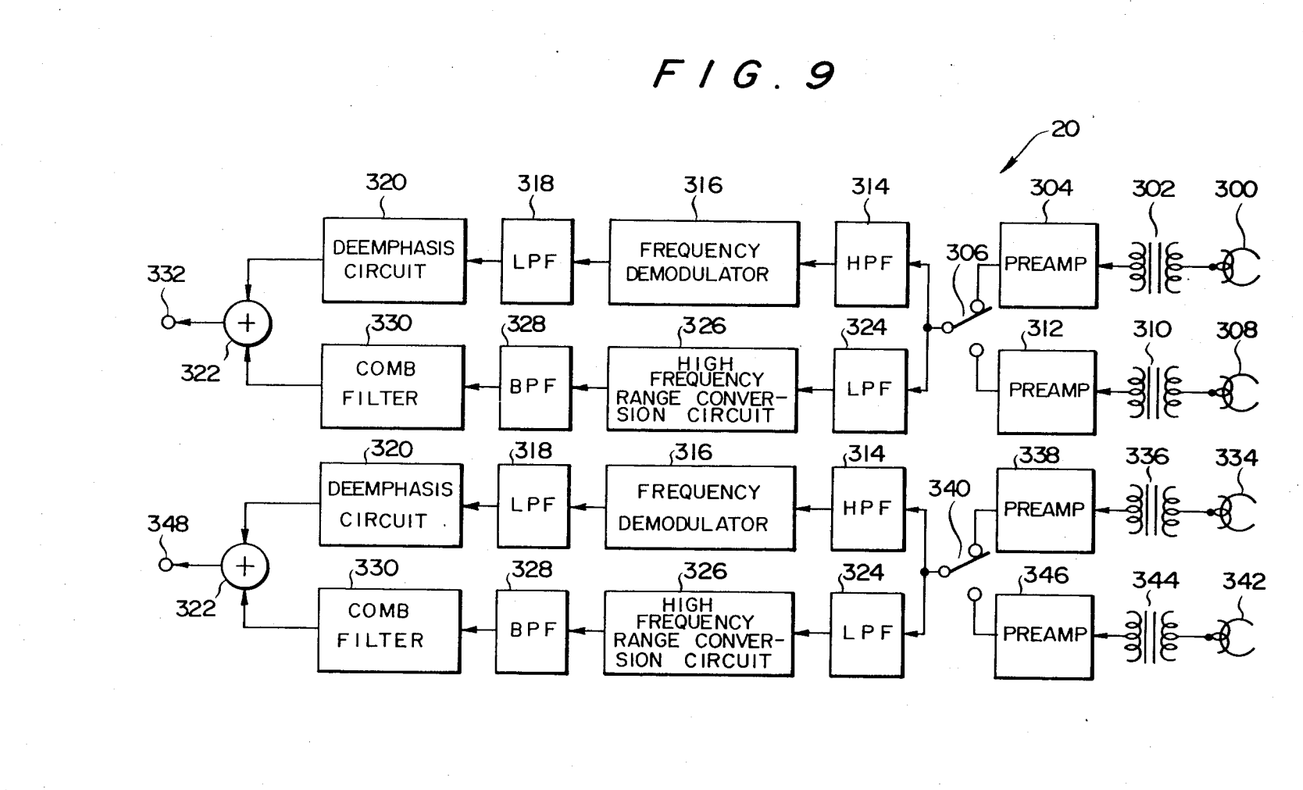
FIG. 9 is a block diagram showing an example of a playback system forming the other part of the recording and playback apparatus of the present invention.
Figure 10:
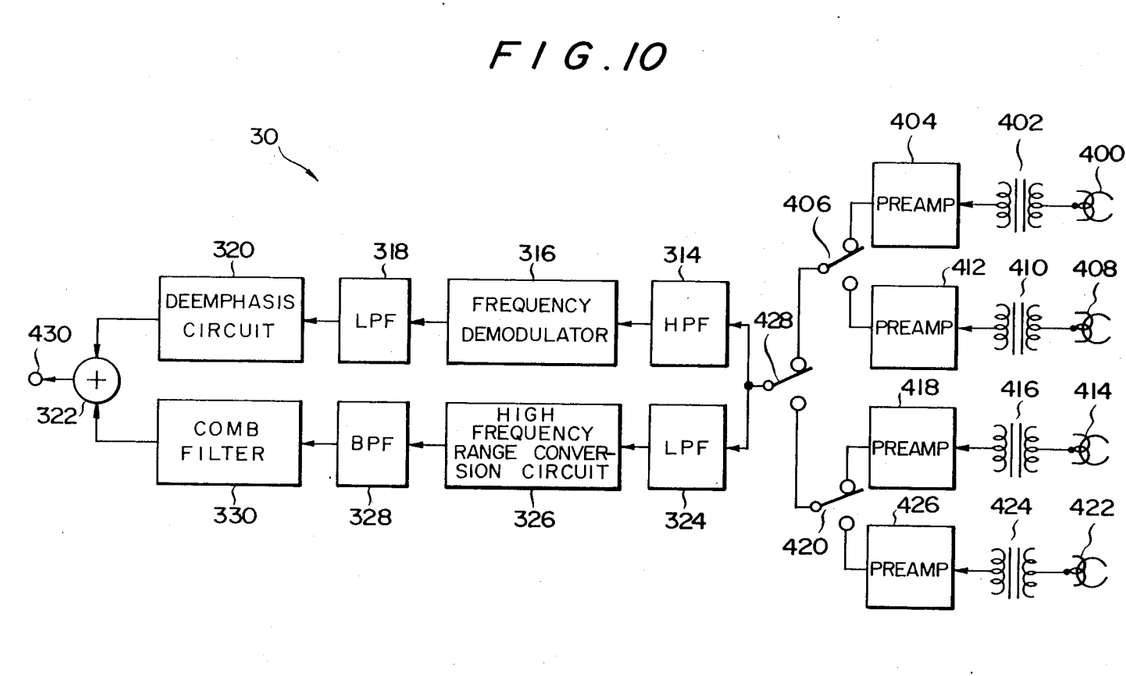
FIG. 10 is a block diagram showing another example of the playback system.

Referring to FIG. 10, there is shown a second example of the playback system of the illustrative recording and playback apparatus. In FIG. 10, the same structural elements as those shown in FIG. 9 are designated by like reference numerals and detailed description thereof will be omitted for simplicity. As shown, the playback system comprises, in addition to the HPF 314, frequency demodulator 316, LPF 318, deemphasis circuit 320, mixer 322, LPF 324, high frequency conversion circuit, BPF 328 and comb filter 330, a playback head 400, a rotary transformer 402, a preamplifier 404, a switch 406, a playback head 408, a rotary transformer 410, a preamplifier 412, a playback head 414, a rotary transformer 416, a preamplifier 418, a switch 420, a playback head 422, a rotary transformer 424, a preamplifier 426, a switch 428, and an output terminal 430.

In FIG. 10, the playback heads 400 and 408, rotary transformers 402 and 410, preamplifiers 404 and 412, and switch 406 constitute a network for reproducing the program A or E out of the recording medium (first video signal stored in the tracks $A_1$ and $A_2$ of FIG. 4 or the tracks $E_1$ and $E_2$ of FIG. 8). Likewise, the playback heads 414 and 422, rotary transformers 416 and 424, preamplifiers 418 and 426, and switch 420 constitute a network for reproducing the program B or F out of the recording medium (second video signal stored in the tracks $B_1$ and $B_2$ of FIG. 4 or the tracks $F_1$ and $F_2$ of FIG. 8).

The switch 428 functions to selectively deliver the signals output from the switches 406 and 420 to a signal processing circuit which will be described, that is, it serves to select either the program A (or E) or the program B (or F). The reproduced signal output from the switch 428 is applied to the output terminal 430 as a reproduced video signal (first or second video signal) after being subjected to signal processing similar to one described in relation with the playback arrangement of FIG. 9.

Figure 11:
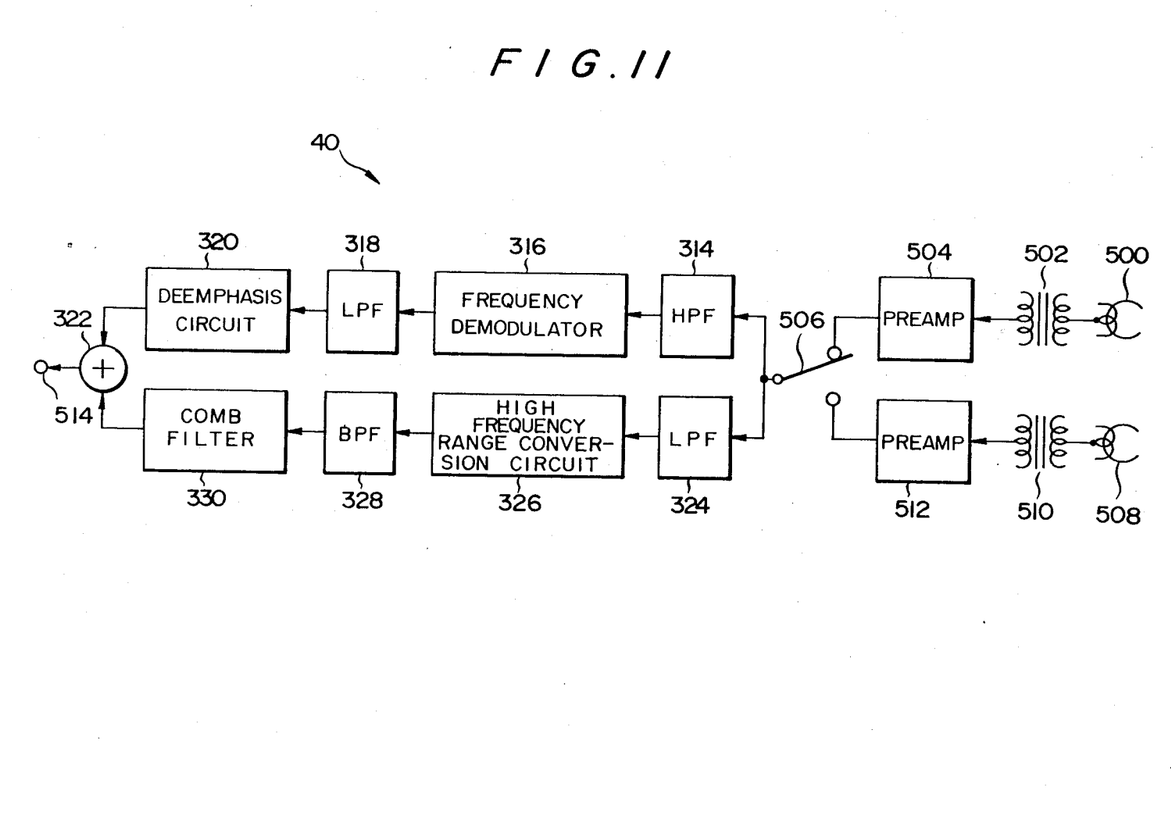
FIG. 11 is a block diagram showing still another example of the playback system.

Referring to FIG. 11, a third example of the playback system in accordance with the present invention is shown. In FIG. 11, the same structural elements as those shown in FIG. 9 are designated by like reference numerals and details thereof will not be described any further. The playback system 40 in FIG. 11 comprises, in addition to the HPF 314, frequency demodulator 316, LPF 318, deemphasis circuit 320, mixer 322, LPF 324, high frequency conversion circuit 326, BPF 328, and comb filter 330, a playback head 500, a rotary transformer 502, a preamplifier 504, a switch 506, a playback head 508, a rotary transformer 510, a preamplifier 512, and an output terminal 514.

The playback arrangement shown in FIG. 11 is identical with those installed in VTRs currently in the market. This implies that even an existing VTR is capable of reproducing video signals which were recorded by the recording and playback apparatus of the present invention. Specifically, assuming that the playback system of FIG. 11 is operating to reproduce the signal in the program A (or E), crosstalk from the program B (or F) does not occur during reproduction of the program A (or E) due to the azimuth effect and the difference in phase shift between the nearby tracks. Such insures faithful reproduction of the program A (or E). Concerning the program B (or F), it will be reproduced by adjusting the head tracking of the VTR. Again, the program B (or F) can be faithfully reproduced due to the azimuth effect and the difference in phase shift between the nearby tracks.

In accordance with the embodiment described above, a single recording and playback apparatus is enabled to record, unattended, a plurality of desired TV programs which are broadcast in the same time zone. Also, a plurality of video cameras may be connected to a single recording and playback apparatus in order to record video and audio signals as desired. For example, one video camera connected to the apparatus may be fixed in place to pick up a desired scene over a wide angle and another may be held by hand to shoot telescopic details of the same scene.

A PCM (pulse code modulation) adapter is known which is an optional unit usable with a recording and playback apparatus for recording and reproducing audio signals as PCM audio signals. The PCM adapter may be connected to the apparatus of the present invention shown and described, which is capable of recording two discrete information signals simultaneously on a single recording medium, in order to record a video signal in the tracks assigned to the program A (first video signal) in the illustrative embodiment and an audio signal passed through the PCM adapter in the tracks assigned to the program B (second video signal). Such allows the audio signal to be recorded and reproduced with high fidelity together with the video signal.

Furthermore, both the programs A and B may be recorded by routing each of the audio signals through a PCM adapter. In such an operation mode, the apparatus of the present invention will implement multi-track recording and playback for recording and reproducing audio signals with high fidelity.

In summary, it will be seen that the present invention provides a recording and playback apparatus which is capable of recording and reproducing a plurality of discrete information signals in and out of a single recording medium.

Various modifications will become possible for those skilled in the art after receiving the teachings of the present disclosure without departing from the scope thereof.

What is claimed is:

1. A single recording and playback apparatus for recording and reproducing at least two discrete input composite video signals in and out of a single recording medium in which the formats of the two video signals conform to an identical industrial standard, comprising:

first record signal generator means for generating a first record signal to be recorded from one of the two composite video signals;

second record signal generator means for generating a second record signal to be recorded by synchronizing a vertical sync signal of the one composite video signal to a vertical sync signal of the other composite video signal; and rotary head means for simultaneously recording the first and second record signals in the recording medium and subsequently reproducing the recorded signals selectively out of the recording medium, said rotary head means comprising two head groups, each head group comprising two heads which are located close to each other with the two heads defining two tracks such that the area corresponding to the track width of a standard VTR is halved every time each head group scans the recording medium.

2. A recording and playback apparatus as claimed in claim 1, wherein the first record signal generator means comprises luminance signal separator means for separating a luminance signal component from the one composite video signal, frequency modulator means for modulating a frequency of the luminance signal component to produce a frequency modulated luminance signal, color signal separator means for separating a color signal from the one composite video signal, low frequency conversion means for producing a low frequency converted color signal by processing the color signal component such that a phase relationship between the color signal components in nearby tracks varies at every one horizontal scan period and by converting a frequency of the color signal component to one in a low frequency band, and mixer means for mixing the frequency modulated luminance signal and the low frequency converted color signal to produce the first record signal.

3. A recording and playback apparatus as claimed in claim 2, wherein the luminance signal component separator means comprises a low-pass filter.

4. A recording and playback apparatus as claimed in claim 3, wherein the first record signal generator means further comprises automatic gain control means for controlling a signal level of the one composite video signal to predetermined one, and preemphasis means for emphasizing a high frequency component of the luminance signal component which is applied thereto from the low-pass filter.

5. A recording and playback apparatus as claimed in claim 2, wherein the color signal component separator means comprises a band-pass filter.

6. A recording and playback apparatus as claimed in claim 5, wherein the first record signal generator means further comprises automatic chroma control means for controlling a level of a color burst signal of the color signal component from the band-pass filter to be constant.

7. A recording and playback apparatus as claimed in claim 1, wherein the second record signal generator means comprises analog-to-digital converter means for analog-to-digital converting the other composite video signal, store means for storing the resulting digital signal, write means for writing the digital signal in said store means, and read means for reading the digital signal out of the store means.

8. A recording and playback apparatus as claimed in claim 7, wherein the store means comprises random access memories.

9. A recording and playback apparatus as claimed in claim 8, wherein the second record signal generator means further comprises digital-to-analog converter means for converting the digital signal read out by the read means to an analog signal.

10. A recording and playback apparatus as claimed in claim 1, wherein one of said head groups comprises a first head pair comprising two rotary heads for recording and reproducing the first record signal in and out of the recording medium, and the other of said head groups comprises two rotary heads for recording and reproducing the second record signal in and out of the recording medium.

11. A recording and playback apparatus as claimed in claim 10, wherein the two rotary heads in each of the first and second head pairs are different in azimuth angle from each other.

12. A recording and playback apparatus as claimed in claim 11, wherein a recording pattern is provided on the recording medium such that nearby tracks are recorded by the rotary heads which are different in azimuth angle from each other and the color signal components recorded in the nearby tracks are different in phase from each other.

13. A single magnetic recording and playback apparatus for recording and reproducing at least two discrete input composite video signals in and out of a single magnetic recording medium in which the formats of the two video signals conform to an identical industrial standard, comprising:

first record signal generator means for generating a first record signal to be recorded from one of the two composite video signals;

second record signal generator means for generating a second record signal to be recorded by synchronizing a vertical sync signal of the one composite video signal to a vertical sync signal of the other composite video signal; and rotary head means for simultaneously recording and reproducing the first and second record signals in the magnetic recording medium and subsequently reproducing the recorded signals selectively out of the magnetic recording medium, said rotary head means comprising two head groups, each head group comprising two heads which are located close to each other with the two heads defining two tracks such that the area corresponding to the track width of a standard VTR is halved every time each head group scans the recording medium.

14. A single recording and playback apparatus for recording and reproducing a plurality of discrete input composite video signals in and out of a single recording medium in which the formats of the two video signals conform to an identical industrial standard, comprising:

first record signal generator means for generating a first record signal to be recorded from one of the plurality of composite video signals;

second record signal generator means for generating a second record signal to be recorded by synchronizing a vertical sync signal of the one composite video signal to a vertical sync signal of another of the composite video signals; and rotary head means supplied with the first and second record signals for simultaneously recording the plurality of composite video signals in the recording medium and subsequently reproducing the recorded signals selectively out of the recording medium, said rotary head means comprising two head groups, each head group comprising two heads which are located close to each other with the two heads defining two tracks such that the area corresponding to the track width of a standard VTR is halved every time each head group scans the recording medium.

* * * * *